April 16, 1940.  T. R. HARRISON  2,197,379
CONTROL APPARATUS
Filed Oct. 17, 1936
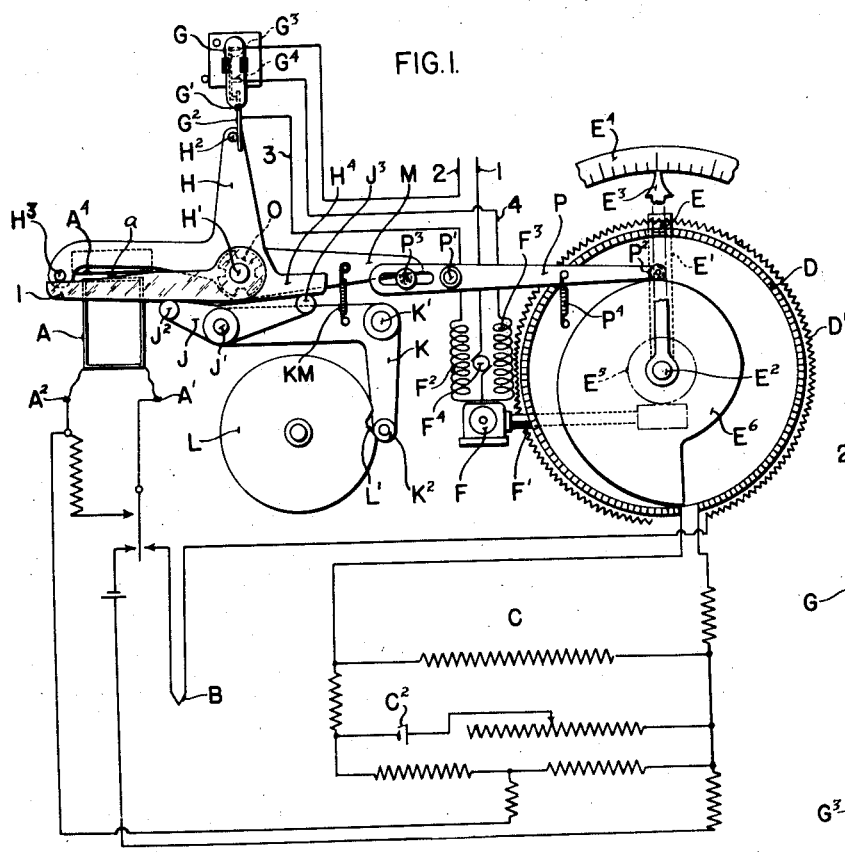
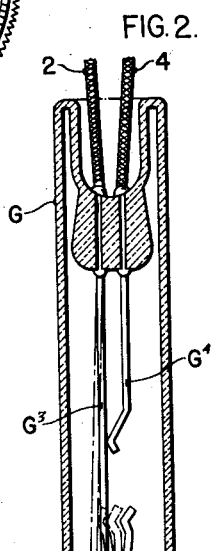
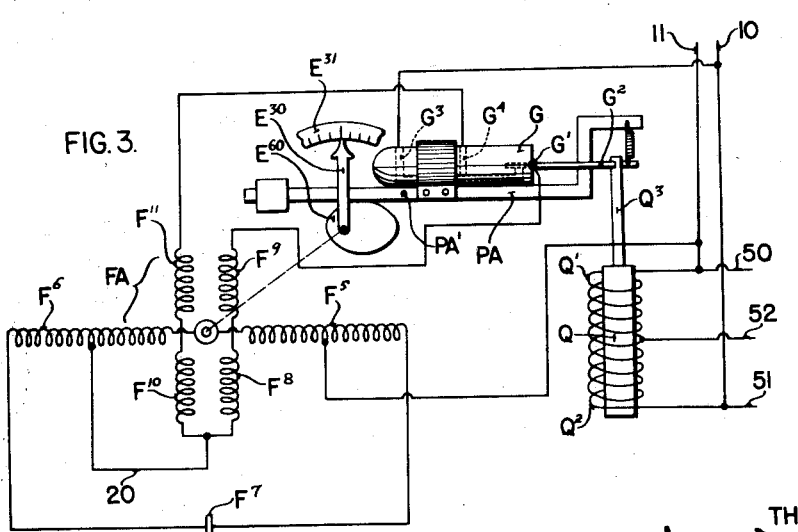
INVENTOR.
THOMAS R. HARRISON
BY *George W. Munnechamp*
ATTORNEY.

Patented Apr. 16, 1940

2,197,379

UNITED STATES PATENT OFFICE 2,197,379

CONTROL APPARATUS

Thomas R. Harrison, Wyncote, Pa., assignor to The Brown Instrument Company, Philadelphia, Pa., a corporation of Pennsylvania Application October 17, 1936, Serial No. 106,128

7 Claims. (Cl. 172—239)

The general object of the present invention is to provide improved means for controlling the operation of a reversible relay motor employed in apparatus of the type including a motor operated in one direction or the other according to the direction of change in a variable quantity which is to be measured or which by its variations determines control actions, and in which the relay motor movement, instituted by a change in said quantity, is terminated after an extent of movement which is predetermined and ordinarily is dependent upon the extent of the variation instituting the movement.

More specifically, the object of the invention is to provide a novel and effective electric control switch arrangement, adapted for use in controlling the operation of the relay motor of apparatus of the above mentioned type.

The various features of novelty which characterize my invention are pointed out with particularity in the claims annexed to and forming a part of this specification. For a better understanding of the invention, however, its advantages, and specific objects attained with its use, reference should be had to the accompanying drawing and descriptive matter in which I have illustrated and described a preferred embodiment of the invention.

Of the drawing:

Fig. 1 is a diagrammatic representation of a potentiometric measuring system including one form of my improved relay motor controlling provisions;

Fig. 2 is an enlarged sectional elevation of a control switch included in the apparatus shown in Fig. 1; and Fig. 3 is a diagrammatic representation of apparatus including a second form of the invention.

In the form of the invention shown in Figs. 1 and 2, A represents the movable element of a galvanometer, the pointer $a$ of which deflects from a neutral position in accordance with the unbalance in a potentiometer measuring circuit C produced by variations in the voltage of a thermocouple B associated with said circuit. The potentiometer circuit is balanced by the adjustment of a contact E bridging slide wire resistances D and D' forming a part of the measuring circuit. As shown, the bridging contact E is carried by an arm E' secured to a rock shaft $E^2$, about which the resistances D and D' extend circularly. A pointer $E^3$ carried by the rock shaft $E^2$ cooperates with a stationary scale $E^4$ to indicate the position of the contact E, and thereby the temperature of the thermocouple B.

The precise form of the potentiometer circuit arrangement illustrated is not a feature of the present invention, and need not be described in detail herein, as said form is well known, and is in extensive use in the commercial "Brown Potentiometer," and is shown in prior patents. It is noted, however, that a current flow of predetermined magnitude through the resistance D, is maintained by a battery or other source of current $C^2$, and that one terminal A' of the galvanometer winding is normally connected to the movable bridging contact E through the thermocouple B or other source of electromotive force to be measured. The second terminal $A^2$ of the galvanometer is so connected to the potentiometer circuit proper, that as the voltage of the thermocouple B changes in one direction or the other, a suitable movement of the bridging contact E in the clockwise or counter-clockwise direction, will make the portion of the total potential drop in the resistance D, which is impressed on the galvanometer terminals A' and $A^2$ in opposition to the thermocouple voltage, equal to the latter, thereby reducing the current flow through the winding of the galvanometer to zero and bringing its pointer $a$ into its neutral position. With the arrangement shown in Fig. 1, the movement of the contact E required to balance the potentiometer circuit, on an increase or decrease in the voltage measured, is in the clockwise or counter-clockwise direction, respectively.

The bridging contact E is given its potentiometer rebalancing movements by a reversible motor F rotating a worm F'' in mesh with a worm gear $E^5$ secured to the shaft $E^2$. The motor F, as shown, comprises field windings $F^2$ and $F^3$, and rotates in one direction or the other accordingly as one or the other of the windings is connected in series with the motor armature $F^4$ between supply conductors 1 and 2, and stalls when both windings are energized at the same time. Which of the field windings is energized, is determined by the adjustment of a control switch G. The latter, as shown, comprises a container, the body of which is formed of glass, but which has one end formed by a flexible resilient disc of metal G', through which a contact $G^2$ extends into the container. The contact $G^2$ is in effect a lever anchored in the disc G' which forms the fulcrum for the latter when its external end is actuated to tilt the lever as hereinafter explained. The contact $G^2$ is connected by conductor 3 to the motor winding $F^2$. Extending into the container at its opposite ends are two contacts $G^3$ and $G^4$. The contact $G^3$ is connected to the supply conductor 2, and the contact $G^4$ is connected by conductor 4 to the field winding $F^3$. In the normal free condition of the switch G, shown in Fig. 2, the contact $G^2$ is out of engagement with contact $G^3$, and the latter is in engagement with the contact $G^4$. A slight adjustment in the counter-clockwise direction of the contact $G^2$ brings the latter into engagement with the contact $G^3$ without breaking the engagement between the latter and the contact $G^4$, but further counter-clockwise adjustment of the contact $G^2$ moves the contact $G^3$ out of engagement with the contact $G^4$.

While the contact $G^2$ of switch G is shown as separated from contact $G^3$ in the normal free position of the switch, the same end may be attained by so arranging the parts that contacts $G^2$ and $G^3$ may contact in the unstressed position of the switch, and subjecting the contact $G^2$ to an external spring or other clockwise bias. The normal separation of contacts $G^2$ and $G^3$ in the form shown may be attained by the proper setting of disc $G'$ or by offsetting contact $G^2$ as shown. When the contact $G^3$ is in engagement with the contact $G^4$, and out of engagement with the contact $G^2$, the winding $F^3$ is energized, and the winding $F^2$ is deenergized, and when the contact $G^3$ is engaged by the contact $G^2$, and is held by the latter out of engagement with the contact $G^4$, the winding $F^3$ is deenergized, and the winding $F^2$ is energized.

The apparatus shown can be rendered operative in the general manner hereinafter described, with the galvanometer connected to the measuring circuit for deflection of its pointer $a$, either to the right or to the left, on an increase in the voltage measured, but to simplify the discussion, it is hereinafter assumed that the pointer deflects to the right on an increase in said voltage. That assumption requires that the motor F rotate in the direction to give a clockwise adjustment to the contact E, when the contact $G^2$ is moved out of engagement with the contact $G^3$, and the winding $F^3$ is energized and the winding $F^2$ is deenergized, and rotate in the direction to give a counter-clockwise adjustment to the contact E, when the winding $F^2$ is energized and the winding $F^3$ is deenergized. When the contact $G^3$ is in engagement with both contacts $G^2$ and $G^4$, which is the normal potentiometer balanced condition of the switch, both windings $F^2$ and $F^3$ are energized, and the motor is stalled, as a result of the balance of the motor turning forces acting in opposite directions.

The angular adjustment or position of the contact $G^2$ at any time, depends upon the angular position of a three arm lever H mounted on a pivot shaft $H'$, and one arm of which carries a pin $H^2$, which engages the external end of the contact lever $G^2$ so as to give the latter a counter-clockwise adjustment when the lever H is adjusted in the clockwise direction from its position shown in Fig. 1. A reverse adjustment of the lever H of sufficient extent permits contact lever $G^2$ to return to its normal free position, in which it is out of engagement with the contact $G^3$, through its intermediate neutral position in which the contact $G^3$ is in engagement with the contacts $G^2$ and $G^4$.

The angular position of the lever H is periodically adjusted into correspondence with the deflected position of the galvanometer pointer $a$, by means comprising a lever I pivotally supported by the pivot shaft $H'$, a lever J pivotally connected at $J'$ to, and supported by a bell crank lever K which is mounted on a pivot $K'$, and a cam L constantly rotating and provided with a peripheral notch $L'$ into which a projection $K^2$ carried by one arm of the lever K moves under a bias force due to a spring KM, when the angular position of the cam disc L permits. The clockwise adjustment given the lever K when the projection $K^2$ enters the notch $L'$, moves a projection $J^2$ carried by one arm of the lever J into engagement with the lever I, and gives the latter a clockwise adjustment about the shaft $H'$. That adjustment moves the lever I into engagement with the galvanometer pointer $a$, and clamps the latter against a stationary abutment edge $A^4$, thereby terminating the adjustment. The pointer engaging edge of the lever I is so shaped that the angular positions of the lever I, when it clamps the pointer against the abutment edge $A^4$, is more or less clockwise accordingly, as the galvanometer pointer $a$ is then at a greater or lesser distance from the right hand limit of its range of deflection.

The clamping of the pointer $a$ against the abutment edge $A^4$ by the lever I, insures the angular adjustment of the lever H into a position dependent upon the deflection at the time of the galvanometer pointer $a$, unless the member H is already in that position. A clockwise adjustment of the lever H, if required, results from the engagement of the lever I with a projection $H^3$ carried by one arm of the lever H. If a counter-clockwise adjustment of the lever H is necessary to make its position correspond to the galvanometer pointer deflection, that adjustment is effected by the engagement of a projection $J^3$ of the lever J at the opposite side of the axis $J'$ from the projection $J^2$, with the third arm $H^4$ of the lever H. Regardless of the direction of movement given the lever H, if any, on each adjustment operation, the movement of the projection $K^2$ into the cam notch $L'$, is positively arrested, and the various levers previously mentioned, are brought into positions dependent on the deflection of the galvanometer pointer $a$, by the engagement of the projections $J^2$ and $J^3$ with the lever I and arm $H^4$, respectively, and the engagement of the projection $H^3$ with the lever I when the pointer is clamped against the abutment edge $A^4$. If when the clamping adjustment is effected, the galvanometer pointer $a$ is in its neutral position, the lever H will not be adjusted, and the switch contact $G^2$ will be left in its normal position, in which it engages the contact $G^3$ without moving the latter out of engagement with the contact $G^4$, so that the motor is stalled and no adjustment of the bridging contact E results. When the galvanometer pointer is out of its neutral position, the completion of the lever adjustment operation will result in motor operation in the direction to rebalance the potentiometer and thereby return the galvanometer pointer back to its neutral position.

The operation of the motor, whenever initiated by a lever adjustment operation, as above described, is terminated after an extent of motor movement which depends upon the extent of departure of the galvanometer pointer from its neutral position, by means of parts comprising a cam $E^6$ carried by the shaft $E^2$, a lever P pivotally mounted on a pivot shaft $P'$ and provided with a roller or other engaging surface $P^2$ bearing against the edge of the cam $E^6$, and an operating connection between the lever P and a lever M operatively related to the lever H. The lever M is journalled on the pivot shaft H', and is frictionally connected to the lever H, as by an interposed friction disc O, so that the lever H tends to turn with the lever M, when not prevented from so doing by the levers J and I. As shown, the operative connection between the levers M and P comprises a pin $P^3$ adjustably secured in a longitudinal slot in the lever P, and against which the lower edge of the lever M is held as by means of the previously mentioned spring KM, which biases the lever K for clockwise adjustment. The lever P is biased for clockwise adjustment, holding the projection $P^2$ against the edge of the cam $E^6$, by a spring $P^4$.

In the operation of the apparatus shown in Figs. 1 and 2, as has been previously explained, whenever the position of the cam L permits, the projection $K^2$ moves into the cam notch L' and the lever H is adjusted into a position corresponding to the deflection of the galvanometer pointer, unless already in that position. Any adjustment in the position of the lever H compels or justment permits an adjustment of the lever contact $G^2$ resulting in the energization of whichever of the two windings $F^2$ and $F^3$ needs to be energized for rotation of the motor in the direction to adjust the contact E in the direction to rebalance the potentiometer and thereby return or tend to return the galvanometer pointer to its neutral position.

When as a result of galvanometer deflection to the right from its neutral position, the lever H is given a counter-clockwise adjustment and deenergizes the winding $F^2$, the motor then operates in the direction to give a clockwise adjustment to the contact E, and a counter-clockwise adjustment to the lever P. The resultant lowering of the pin $P^3$ permits a clockwise adjustment of the lever M under the action of the spring KM. That adjustment of the lever M is shared by the lever H due to their frictional connection, and the fact that by the time the motor operation is under way, the lever K has been turned counterclockwise by the cam disc L, so that the movement of the lever H is not then restrained by the lever J. The clockwise adjustments of the contact E and cam $E^6$ continue until the clockwise adjustment of the lever H has returned the contact $G^2$ into engagement with the contact $G^3$, whereupon the motor stalls. Conversely, when the galvanometer pointer is clamped between the lever I and the edge $A^4$, with the pointer at the left of its neutral position, as a result of a decrease in the thermocouple voltage, the resultant clockwise adjustment of the lever H starts the motor into operation in the direction to give a counter-clockwise adjustment to the contact E and cam $E^6$. As the latter turns counter-clockwise, the lever P turns clockwise under the action of the spring $P^4$. This raises the pin $P^3$ and gives a counter-clockwise adjustment to the arm M and thereby to the lever H, which is continued until the contact $G^2$ permits the contact $G^3$ to engage the contact $G^4$ and stall the motor. In each case, the extent of motor movement initiated by the clamping of the galvanometer pointer between the lever I and edge $A^4$, is proportional to the extent of deflection of the galvanometer pointer $a$ from its neutral position, and when the motor is subsequently stalled, the pointer $E^3$ is left in a position relative to the scale $E^4$ indicating the value of the thermocouple voltage at the time at which the galvanometer pointer was clamped between the lever I and edge $A^4$.

As will be apparent, no adjustment of the member H effected by the operation of the levers J and K directly changes the position of the lever or arm M, but involves a relative adjustment of the levers H and M. Every motor operation serves through the cam $E^6$ to give an adjustment to the lever M, and that adjustment is shared by the lever H. To minimize the spring forces necessary to prevent movements of the levers M and P, as the lever H is being adjusted by the levers K and J, the arm of the lever J carrying the projection $J^3$, is advantageously made longer than the arm carrying the projection $J^2$.

The principles of the invention may be used in apparatus differing from that shown in Figs. 1 and 2 in respect to the character of the motor employed, and in respect to the manner in which the control switch contacts are adjusted to initiate and terminate the motor operation. Thus, as shown in Fig. 3, the relay motor FA may be a so-called condenser motor, and the switch G is mounted on, and is bodily movable with a lever PA pivoted at $PA^1$, which is adjusted by the motor FA as the lever P is adjusted by the motor E in the construction first described, and the contact lever $G^2$ has its external end connected to means for moving it in response to variations in a control force.

The motor FA is energized by alternating current supply conductors 10 and 11, and comprises a first energizing winding including sections $F^5$ and $F^6$, and comprises two alternate windings, one including sections $F^8$ and $F^9$, and the other including sections $F^{10}$ and $F^{11}$. The first winding sections $F^5$ and $F^6$ are connected in series with one another and with a condenser $F^7$. The section $F^5$ has its mid point connected to the supply conductor 11. The section $F^6$ has its mid point connected by a conductor 20 to one terminal of each of the sections $F^8$ and $F^{10}$ of one of the alternate windings. The two sections $F^8$ and $F^9$ are connected in series with one another between the conductor 20 and the switch contact $G^2$. The two sections $F^{10}$ and $F^{11}$ of the other alternate winding are connected in series with one another between the conductor 20, and the switch contact $G^4$. The supply conductor 10 is connected to the switch contact $G^3$.

The angular position of the lever PA is adjusted by the rotation of the motor through a cam $E^{60}$, similar to the cam $E^6$ of the construction first described, and connected to and rotated by the motor FA. The motor tuning tendencies of the two alternate windings are equal and opposite so that the motor stalls when both windings are energized. When the winding including the sections $F^8$ and $F^9$ is energized, and the other alternate winding is deenergized, the motor operates in the direction to give a clockwise adjustment to the cam $E^{60}$ and when the winding including sections $F^8$ and $F^9$ is deenergized and the other alternate winding is energized, the motor operates in the direction to give a counterclockwise adjustment to the cam $E^{60}$.

The device Q shown in Fig. 3, is the armature of the receiving element of an inductance bridge of the character disclosed in my prior Patent No. 1,743,852, granted January 14, 1930, and is given up and down movements as described in said prior patent, by changes in the relative inductances of end to end sections $Q^1$ and $Q^2$ of a solenoid coil in which the armature Q is axially movable. The remote terminals of the coil sections $Q^1$ and $Q^2$ are connected to conductors 50 and 51, respectively, and the adjacent terminals of the two sections are connected to a conductor 52. The currents flowing in the conductors 50, 51, and 52, may be varied to change the axial position of the armature Q in the solenoid coil in the precise manner disclosed in my said prior patent, or in known alternative ways, and the inductance bridge need not be further illustrated or described herein, as its only characteristic of importance herein, is that it serves to adjust the contact $G^2$ in accordance with changes in a controlling or measurable quantity.

The armature Q is connected by a connecting member $Q^3$ to the other end of the contact $G^2$, so that when a change in one direction in the relative inductances of the coil sections $Q^1$ and $Q^2$ occurs, the armature Q will move down and thereby adjust the contact $G^2$ in the clockwise direction, and thereby move the inner end of the contact $G^2$ away from the contact $G^3$, and when the change is in the opposite direction, give a counter-clockwise adjustment to the contact $G^2$ and move its inner end toward the contact $G^3$. When the contact lever $G^2$ is so adjusted in the clockwise direction, the winding including the sections $F^8$ and $F^9$, is deenergized, and the other alternate winding then coacts with the first winding to give a counter-clockwise adjustment to the cam $E^{60}$, thereby bodily lowering the switch G until the contact $G^2$ engages the contact $G^3$, whereupon the motor stalls. Conversely, an up-movement of the member Q gives a counter-clockwise adjustment to the lever contact $G^2$, whereby the contact $G^3$ is moved out of engagement with the contact $G^4$ and deenergizes the winding including the sections $F^{10}$ and $F^{11}$. The motor then operates to give a clockwise adjustment to the cam $E^{60}$ bodily raising the switch until the contact $G^3$ engages contact $G^4$ and the motor stalls.

With the described operation of the apparatus shown in Fig. 3, the angular position of the lever PA corresponds to, and indicates the value of the quantity controlling the vertical position of the armature Q. As will be apparent to those skilled in the art, the lever PA may itself serve as an indicating pointer, or may be connected to, and actuate a separate pointer recording pen or the like, and may also be employed to adjust a control valve or switch by which control effects are produced in accordance with changes in the value of the quantity which determines the vertical position of the armature Q relative to the coil sections $Q^1$ and $Q^2$. The cam $E^{60}$ may, of course, be arranged to give any desired proportionality between the movement of armature Q and the movement of an indicating element such as the element $E^{30}$. For example, if the member Q is responsive to flow variations and is actuated directly from a differential pressure measuring or other device in other than linear proportion to the flow being measured, the cam $E^{60}$ may be evenly divided when calibrated in terms of flow.

For some purposes, the form of the invention shown in Fig. 3 possesses a readily apparent advantage over that shown in Fig. 1, in that it includes no part which must be driven by a motor or other power device separate from the relay motor, as is the case with the timing cam L of Fig. 1. The apparatus shown in Fig. 1, however, is adapted for use where the controlling force is too small to directly move the controlling contact $G^2$.

Subject matter disclosed but not claimed in this application is disclosed and is being claimed in my copending application Serial No. 294,549, filed September 12, 1939.

While in accordance with the provisions of the statutes, I have illustrated and described the best forms of embodiment of my invention now known to me, it will be apparent to those skilled in the art that changes may be made in the form of the apparatus disclosed without departing from the spirit of my inevntion as set forth in the appended claims and that in some cases certain features of my invention may be used to advantage without a corresponding use of other features.

Having now described my invention, what I claim as new and desire to secure by Letters Patent, is:

1. In apparatus of the character described, the combination of a control switch comprising a supoprt with three contacts mounted thereon, one of said contacts being biased for movement into engagement with a second one of said contacts, and the third contact being adjustable relative to said support from an intermediate position into positions at opposite sides thereof, and being adapted when in its intermediate position to engage said second contact without moving the latter out of engagement with said one contact and when at one side of said intermediate position to disengage said second contact and when at the other side of said intermediate position to engage said second contact and hold the latter out of engagement with said one contact, means responsive to a variable condition for moving said third contact to one side or the other of said intermediate position on a change in said condition in one direction or the other, and means controlled by said contacts and set into operation on a movement of said third contact out of its intermediate position to move said support relative to said third contact in the direction to restore the intermediate position relation of said support and third contact.

2. In apparatus of the character described, the combination of a control switch comprising three contacts, one of said contacts being biased for movement into engagement with a second one of said contacts, and the third contact being adjustable from an intermediate position into positions at opposite sides thereof, and being adapted when in its intermediate position to engage said second contact without moving the latter out of engagement with said one contact and when at one side of said intermediate position to disengage said second contact and when at the other side of said intermediate position to engage said second contact and hold the latter out of engagement with said one contact, a member movable to adjust said third contact into its different positions, and means responsive to a variable condition for moving said member to adjust said third contact to one side or the other of said intermediate position on a change in said condition in one direction or the other, and means controlled by said contacts and set into operation on a movement of said third contact out of its intermediate position to move said member in the direction to return said third contact into said intermediate position.

3. Apparatus as specified in claim 2, in which the said control switch includes a container enclosing the engaging portions of said contacts and in which said container comprises a flexible wall portion supporting said third contact and flexed by said movable member to thereby adjust said third contact into its different positions specified in claim 2.

4. In a self-balancing electrical system, a galvanometer responsive to system unbalance and having a coil which has a predetermined position in space when said system is balanced, a reversible electrical motor, means under control of said motor for restoring the balance of said system, a selective switch mechanism having two positions selectively controlled by said galvanometer coil to energize said motor for rotation in one direction or the other to restore system balance on unbalance thereof in one direction or the other and an intermediate position in which said motor is not rotated, and means independent of said galvanometer to adjust said switch mechanism to said intermediate position to interrupt the rotation of said motor.

5. In a self-balancing electrical system, a galvanometer responsive to system unbalance and having a coil which has a predetermined position in space when said system is balanced, a reversible electrical motor, means under control of said motor for restoring the balance of said system, switch mechanism controlled by said galvanometer coil to energize said motor in a direction to restore system balance on unbalance thereof, and means controlled by said switch mechanism and independent of said galvanometer to control said switch mechanism to interrupt the rotation of said motor.

6. In a self-balancing electrical system, a device responsive to system unbalance and having a member which has a predetermined position in space when said system is balanced, a reversible electrical motor, means under control of said motor for restoring the balance of said system, switch mechanism controlled by said member to energize said motor for rotation in a direction to restore system balance on unbalance thereof, and means controlled by said motor and independent of said device to control said switch mechanism to interrupt the rotation of said motor.

7. In a self balancing electrical system, a device responsive to system unbalance and having a deflectable member which has a predetermined position in space when said system is balanced, a reversible electrical motor, means under control of said motor for restoring the balance of said system, switch mechanism controlled by said member to energize said motor for rotation in a direction to restore system balance on unbalance thereof, and a lever controlled by said motor and having a frictional connection with said switch mechanism to interrupt the rotation of said motor independently of said device.

THOMAS R. HARRISON.